US010009052B2

(12) United States Patent
Khlat et al.

(10) Patent No.: US 10,009,052 B2
(45) **Date of Patent: *Jun. 26, 2018**

(54) UL CA TX-TX TUNABLE CROSS-ISOLATION METHOD

(71) Applicant: Qorvo US, Inc., Greensboro, NC (US)

(72) Inventors: Nadim Khlat, Cugnaux (FR); Gernot Fattinger, Sorrento, FL (US); Marcus Granger-Jones, Scotts Valley, CA (US); Robert Aigner, Ocoee, FL (US)

(73) Assignee: Qorvo US, Inc., Greensboro, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/420,369

(22) Filed: Jan. 31, 2017

(65) Prior Publication Data

US 2017/0222672 A1 Aug. 3, 2017

Related U.S. Application Data

(60) Provisional application No. 62/289,576, filed on Feb. 1, 2016.

(51) Int. Cl.
*H04B 14/06* (2006.01)
*H04B 1/10* (2006.01)
*H04B 1/00* (2006.01)

(52) U.S. Cl.
CPC ........... *H04B 1/1018* (2013.01); *H04B 1/006* (2013.01)

(58) Field of Classification Search
CPC .............................. H04B 1/1018; H04B 1/006
USPC .......................................................... 375/350
See application file for complete search history.

(56) References Cited

U.S. PATENT DOCUMENTS

2010/0048146 A1* 2/2010 McCallister ........... H04B 1/525 455/78
2014/0348032 A1* 11/2014 Hua ......................... H04B 1/44 370/277
2015/0200437 A1* 7/2015 Solomko ................ G01R 21/07 333/2
2015/0303981 A1* 10/2015 Sjoland .................. H04B 1/525 370/278
2016/0094331 A1* 3/2016 White ..................... H04B 1/525 370/278
2016/0277046 A1* 9/2016 Pratt .................... H04B 1/0475

* cited by examiner

*Primary Examiner* — Helene Tayong
(74) *Attorney, Agent, or Firm* — Withrow & Terranova, P.L.L.C.

(57) ABSTRACT

RF filtering circuitry includes a first transmit signal node, a second transmit signal node, a common node, first transmit signal filtering circuitry, second transmit signal filtering circuitry, and transmit signal cancellation circuitry. The first transmit signal filtering circuitry is coupled between the first transmit signal node and the common node and is configured to pass RF transmit signals within a first transmit signal frequency band while attenuating signals outside the first transmit signal frequency band. The second transmit signal filtering circuitry is coupled between the second transmit signal node and the common node and is configured to pass RF transmit signals within a second transmit signal frequency band while attenuating signals outside the second transmit signal frequency band. The transmit signal cancellation circuitry is coupled between the common node and the second transmit signal node and is configured to generate a transmit cancellation signal.

23 Claims, 14 Drawing Sheets

36
40A
38A
38C
38B
40B
S_CAN
SIGNAL CANCELLATION 42
CONTROL 44

UL CA TX-TX TUNABLE CROSS-ISOLATION METHOD

RELATED APPLICATIONS

This application claims the benefit of provisional patent application Ser. No. 62/289,576, filed Feb. 1, 2016, the disclosure of which is hereby incorporated herein by reference in its entirety.

FIELD OF THE DISCLOSURE

The present disclosure relates to radio frequency (RF) filtering circuitry, and in particular to RF filtering circuitry including signal cancellation circuitry.

BACKGROUND

Radio frequency (RF) filtering circuitry is critical to the operation of modern wireless communications devices. RF filtering circuitry is often used to isolate RF signals within different frequency bands from one another, allowing wireless communications devices to communicate in a number of different frequency bands (i.e., operating bands), either separately or simultaneously. FIG. 1 illustrates conventional RF filtering circuitry 10. The conventional RF filtering circuitry 10 is a diplexer including a first input/output node 12A, a second input/output node 12B, and a common node 12C. A power amplifier 14, a low noise amplifier 16, and an antenna 18 are shown for context. The power amplifier 14 is coupled between a transmit signal node 20 and the first input/output node 12A. The low noise amplifier 16 is coupled between a receive signal node 22 and the second input/output node 12B. The antenna 18 is coupled to the common node 12C.

The conventional RF filtering circuitry 10 is configured to pass RF transmit signals TX within a transmit signal frequency band from the power amplifier 14 to the antenna 18 while attenuating signals outside the transmit signal frequency band. Further, the conventional RF filtering circuitry 10 is configured to pass RF receive signals RX within a receive frequency band from the antenna 18 to the low noise amplifier 16 while attenuating signals outside the receive frequency band. In general, the RF transmit signal provided by the power amplifier 14 is a high power signal when compared to the RF receive signals RX from the antenna 18. Accordingly, it is crucial for the conventional RF filtering circuitry 10 to adequately attenuate the RF transmit signal and harmonics thereof before it reaches the low noise amplifier 16. Failing to do so may result in compression of the receive signal chain and/or leakage of intermodulation products from the transmit signal and one or more blocker signals into the receive signal path. When the conventional RF filtering circuitry 10 supports only a small number of RF frequency bands such as the diplexer shown in FIG. 1, providing adequate attenuation may be routine. However, as the number of RF frequency bands supported by the conventional RF filtering circuitry 10 increases, the ability of the circuitry to provide adequate attenuation often decreases significantly.

FIG. 2 shows conventional RF filtering circuitry 24 configured to support additional RF frequency bands. The conventional RF filtering circuitry 24 is a hexaplexer including a first input/output node 26A, a second input/output node 26B, a third input/output node 26C, a fourth input/output node 26D, a fifth input/output node 26E, a sixth input/output node 26F, and a common node 26G. A first power amplifier 28A, a second power amplifier 28B, a third power amplifier 28C, a first low noise amplifier 30A, a second low noise amplifier 30B, a third low noise amplifier 30C, and an antenna 32 are shown for context. The first power amplifier 28A is coupled between a first input/output node 34A and the first input/output node 26A. The first low noise amplifier 30A is coupled between a first second input/output node 36A and the second input/output node 26B. The second power amplifier 28B is coupled between a second input/output node 34B and the third input/output node 26C. The second low noise amplifier 30B is coupled between a second input/output node 36B and the fourth input/output node 26D. The third power amplifier 28C is coupled between a third first input/output node 34C and the fifth input/output node 26E. The third low noise amplifier 30C is coupled between a third second input/output node 36C and the sixth input/output node 26F. The antenna 32 is coupled to the common node 26G.

In operation, the conventional RF filtering circuitry 24 is configured to pass first RF transmit signals TX1 within a first transmit signal frequency band from the first power amplifier 28A to the antenna 32 while attenuating signals outside the first transmit signal frequency band, pass second RF transmit signals TX2 within a second transmit signal frequency band from the second power amplifier 28B to the antenna 32 while attenuating signals outside the second transmit signal frequency band, and pass third RF transmit signals TX3 within a third transmit signal frequency band from the third power amplifier 28C to the antenna 32 while attenuating signals outside the third transmit signal frequency band. Further, the conventional RF filtering circuitry 24 is configured to pass first RF receive signals RX1 within a first receive signal frequency band from the antenna 32 to the first low noise amplifier 30A while attenuating signals outside the first receive signal frequency band, pass second RF receive signals RX2 within a second receive signal frequency band between the antenna 32 and the second low noise amplifier 30B while attenuating signals outside the second receive signal frequency band, and pass third RF receive signals RX3 within a third receive signal frequency band between the antenna 32 and the third low noise amplifier 30C while attenuating signals outside the third receive signal frequency band.

In general, the RF transmit signals provided by the first power amplifier 28A, the second power amplifier 28B, and the third power amplifier 28C may be high power signals when compared to the RF receive signals from the antenna 32. Accordingly, it is crucial for the conventional RF filtering circuitry 24 to adequately attenuate the RF transmit signals and harmonics thereof before they reach the first low noise amplifier 30A, the second low noise amplifier 30B, and/or the third low noise amplifier 30C. Failing to do so may result in desensitization and/or damage to these low noise amplifiers, especially when one or more harmonics of the RF transmit signals fall at or near the receive signal frequency band of the particular signal path.

When the conventional RF filtering circuitry 24 supports a relatively large number of RF frequency bands such as the hexaplexer shown in FIG. 2, it may be difficult to achieve the necessary isolation in each receive signal path to prevent desensitization of the first low noise amplifier 30A, the second low noise amplifier 30B, and/or the third low noise amplifier 30C. This problem may be exacerbated in carrier aggregation schemes in which multiple RF transmit signals and/or multiple RF receive signals are simultaneously processed by the conventional RF filtering circuitry 24, as intermodulation distortion products may form due to the interaction of the various signals at the common node 26G that may be particularly difficult to attenuate. Accordingly, there is a need for improved RF filtering circuitry able to adequately attenuate undesired signals.

SUMMARY

The present disclosure relates to radio frequency (RF) filtering circuitry, and in particular to RF filtering circuitry including signal cancellation circuitry. In one embodiment, RF filtering circuitry includes a first transmit signal node, a second transmit signal node, a common node, first transmit signal filtering circuitry, second transmit signal filtering circuitry, and transmit signal cancellation circuitry. The first transmit signal filtering circuitry is coupled between the first transmit signal node and the common node and is configured to pass RF transmit signals within a first transmit signal frequency band between the first transmit signal node and the common node while attenuating signals outside the first transmit signal frequency band. The second transmit signal filtering circuitry is coupled between the second transmit signal node and the common node and is configured to pass RF transmit signals within a second transmit signal frequency band between the second transmit signal node and the common node while attenuating signals outside the second transmit signal frequency band. The transmit signal cancellation circuitry is coupled between the common node and the second transmit signal node and is configured to generate a transmit cancellation signal from the RF transmit signals within the first transmit signal frequency band and provide the transmit cancellation signal to the second transmit signal node in order to cancel one or more components of the RF transmit signals within the first transmit signal frequency band at the second transmit signal node. By using the transmit signal cancellation circuitry to cancel one or more components of the RF transmit signals within the first transmit signal frequency band at the second transmit signal node, isolation of the RF transmit signals within the first transmit signal frequency band from the RF transmit signals within the second transmit signal frequency band may be improved. Further, the attenuation requirements of the second transmit signal filtering circuitry at the first transmit signal frequency band may be reduced, thereby improving the flexibility in the design of the RF filtering circuitry.

In one embodiment, the transmit cancellation signal is based on a transmit frequency of the RF transmit signals within the first transmit signal frequency band. By basing the transmit cancellation signal on the transmit frequency of the RF transmit signals within the first transmit signal frequency band, additional attenuation specifically targeted at the RF transmit signals within the first frequency band may be provided, thereby improving isolation of the RF transmit signals within the first transmit signal frequency band from the RF transmit signals within the second transmit signal frequency band.

In one embodiment, the transmit signal cancellation circuitry comprises an adjustable attenuator configured to adjust an amplitude of the RF transmit signals within the first transmit signal frequency band and an adjustable phase shifter configured to adjust a phase of the RF transmit signals within the first transmit signal frequency band. Further, the RF filtering circuitry comprises common node coupling circuitry and transmit node coupling circuitry. The common node coupling circuitry is coupled between the signal processing circuitry and the common node. The transmit node coupling circuitry is coupled between the signal processing circuitry and the second transmit signal node.

In one embodiment, the adjustable attenuator and the adjustable phase shifter are adjusted based on a transmit frequency of the RF transmit signals within the first transmit signal frequency band.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 2:
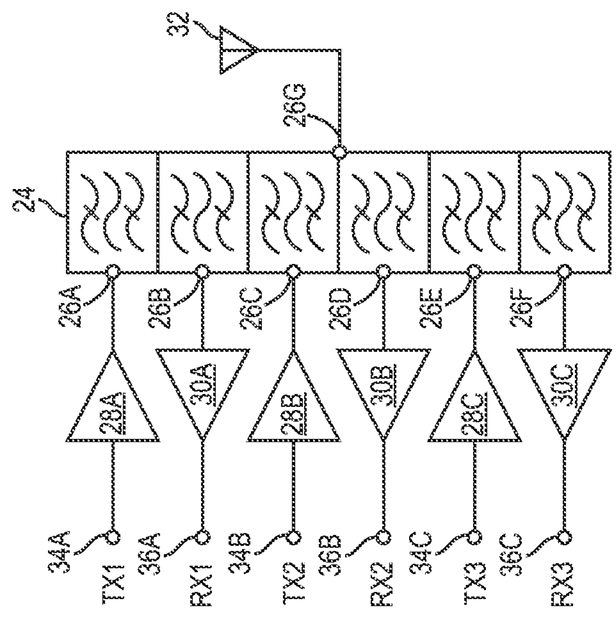
FIGS. 1 and 2 show conventional radio frequency (RF) filtering circuitry.
Figure 1:
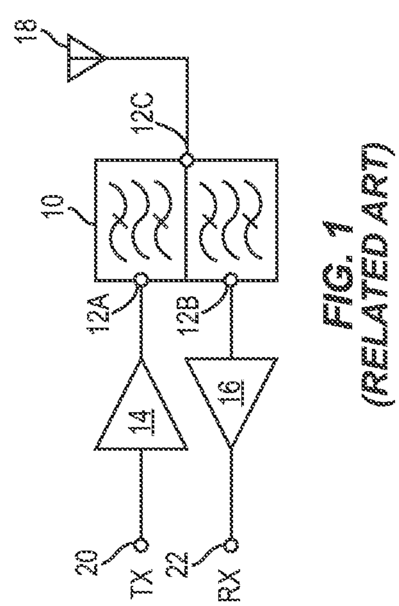
Figure 3:
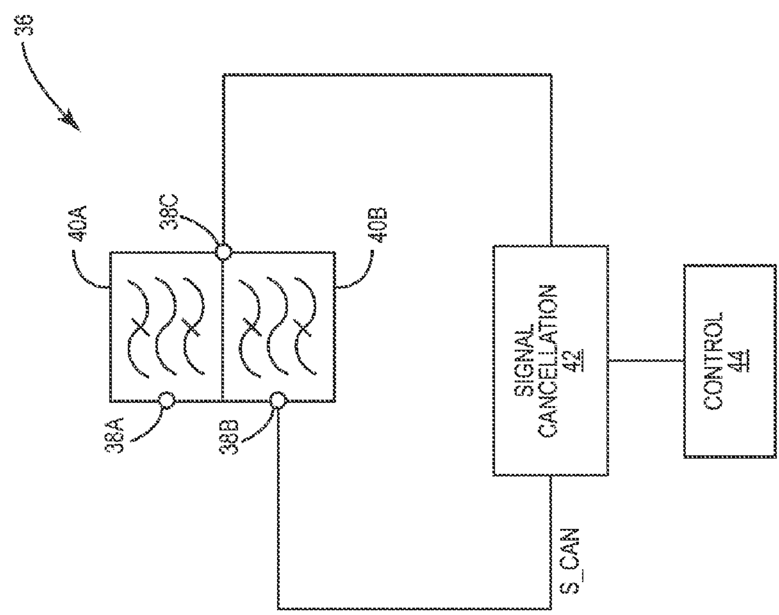
FIGS. 3 through 15 show RF filtering circuitry according to various embodiments of the present disclosure.

FIG. 3 illustrates radio frequency (RF) filtering circuitry 36 according to one embodiment of the present disclosure. The RF filtering circuitry 36 includes a first input/output node 38A, a second input/output node 38B, and a common node 38C. First filtering circuitry 40A is coupled between the first input/output node 38A and the common node 38C. Second filtering circuitry 40B is coupled between the second input/output node 38B and the common node 38C. The first filtering circuitry 40A and the second filtering circuitry 40B may form a diplexer, duplexer, or any n-plexer, as shown in FIG. 3. Signal cancellation circuitry 42 is coupled between the common node 38C and the second input/output node 38B. Control circuitry 44 may be coupled to the signal processing circuitry 42.

In operation, the first filtering circuitry 40A may be configured to pass RF signals within a first frequency band between the first input/output node 38A and the common node 38C while attenuating signals outside of the first frequency band. The second filtering circuitry 40B may be configured to pass RF signals within a second frequency band between the second input/output node 38B and the common node 38C while attenuating signals outside of the second frequency band. Notably, as discussed above, if a transmit signal within the first frequency band is passed from the first input/output node 38A to the common node 38C, the second filtering circuitry 40B must significantly attenuate this signal to avoid desensitizing downstream receiver circuitry coupled to the second input/output node 38B. This may be difficult due to the strength of the transmit signal and the constraints on the design of the first filtering circuitry 40A and/or the second filtering circuitry 40B. Accordingly, the signal cancellation circuitry 42 is configured to generate a cancellation signal S_CAN from the RF signals within the first frequency band at the common node 38C and provide the cancellation signal to the second input/output node 38B in order to cancel one or more components of the RF signals within the first frequency band at the second input/output node.

By cancelling RF signals within the first frequency band at the second input/output node 38B, the isolation of the RF signals within the first frequency band from the RF signals within the second frequency band may be significantly improved when compared to using the first filtering circuitry 40A and the second filtering circuitry 40B alone. Further, providing additional attenuation within the first frequency band may significantly increase the flexibility afforded in the design of the first filtering circuitry 40A and/or the second filtering circuitry 40B, as the attenuation of this primary blocker signal (i.e., the RF signals within the first frequency band) generally dictate many of the design constraints thereof.

In some embodiments, the cancellation signal S_CAN generated by the signal cancellation circuitry 42 is based on a frequency of the RF signals within the first frequency band. As will be appreciated by those of ordinary skill in the art, the first frequency band may encompass a range of frequencies, while the RF signals within the first frequency band may be provided at a particular frequency or a sub-range of frequencies. For example, the first frequency band may be a Long Term Evolution (LTE) operating band, and the RF signals within the first frequency band may be provided at one or more resource blocks within the operating band. The ability of the signal cancellation circuitry 42 to provide the cancellation signal S_CAN may be limited to a relatively narrow bandwidth (e.g., one or two resource blocks). That is, the signal cancellation circuitry 42 may only be capable of generating the cancellation signal S_CAN in order to cancel signals within a narrow range of frequencies, rather than over the entirety of the first frequency band. By providing the cancellation signal S_CAN based on the specific frequency of the RF signals within the first frequency band, the cancellation may be provided at the precise frequency required to cancel the RF signals within the first frequency band, which may forego the need for wide bandwidth signal cancellation circuitry 42 and thereby reduce the necessary complexity and size of the signal cancellation circuitry 42.

The control circuitry 44 may provide one or more control signals to the signal cancellation circuitry 42 in order to control the amplitude, phase, or any other aspect of the transmit cancellation signal S_CAN. While the control circuitry 44 is shown integrated with the RF filtering circuitry 36, the control circuitry 44 may also be provided centrally along with other control mechanisms for a wireless communications device external to the RF filtering circuitry 36. For example, control signals may be provided to the signal cancellation circuitry 42 via a central controller that is part of RF front end circuitry including the RF filtering circuitry 36 without departing from the principles of the present disclosure.

As discussed above, the signal cancellation circuitry 42 may be used to cancel RF transmit signals in an RF receive path. However, the signal cancellation circuitry 42 may also be used to cancel RF transmit signals in a separate RF transmit path, or may be used to cancel any number of different undesired signals at the common node 38C, such as intermodulation distortion products, harmonics, or the like.

Figure 4:
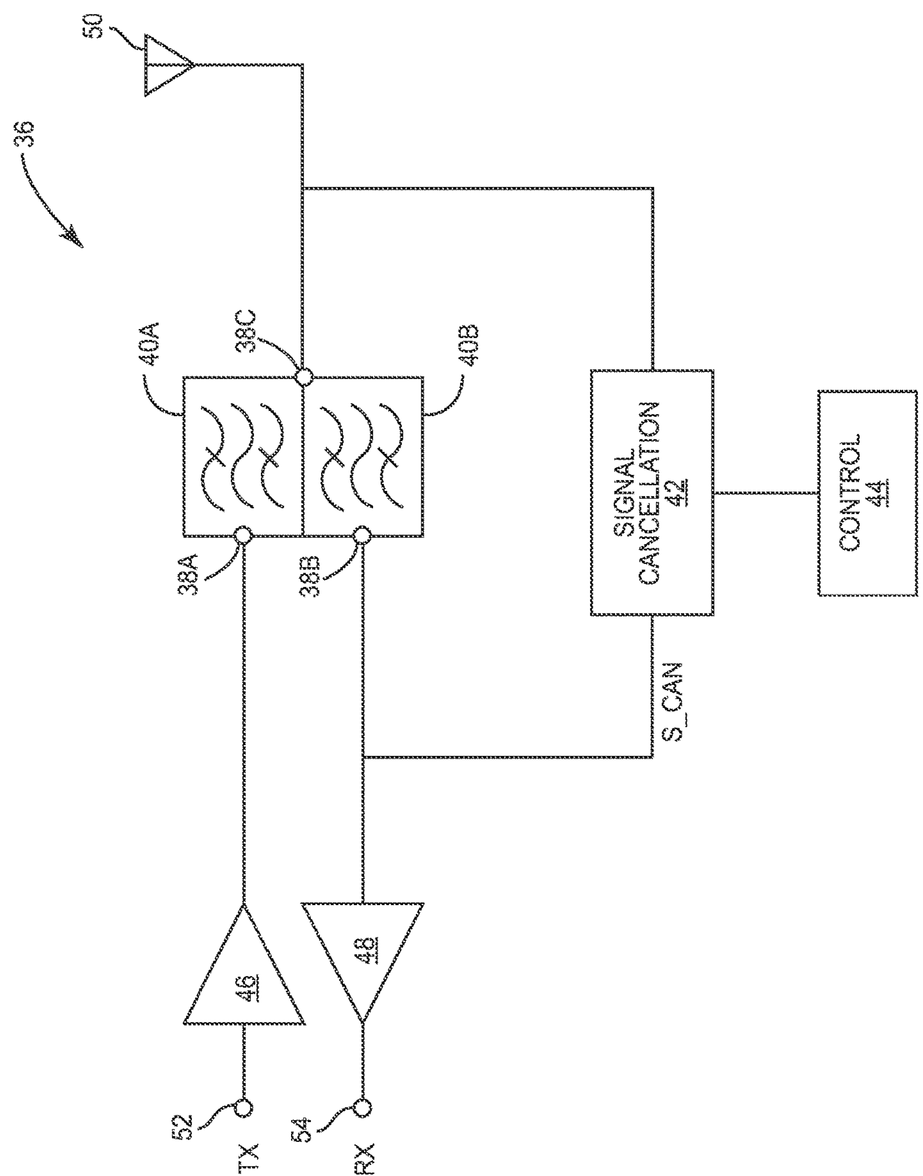

FIG. 4 shows the RF filtering circuitry 36 shown in FIG. 3 and additionally shows a power amplifier 46, a low noise amplifier 48, and an antenna 50 for context. The power amplifier 46 is coupled between a transmit signal node 52 and the first input/output node 38A. The low noise amplifier 48 is coupled between a receive signal node 54 and the second input/output node 38B. The antenna 50 is coupled to the third input/output node 38C. Similar to the above, the first filtering circuitry 40A is configured to pass RF transmit signals within a transmit signal frequency band between the first input/output node 38A and the common node 38B while attenuating signals outside the transmit signal frequency band. The second filtering circuitry 40B is configured to pass RF receive signals RX within a receive signal frequency band between the common node 38C and the second input/output node 38B while attenuating signals outside the receive signal frequency band. The power amplifier 46 is configured to receive RF transmit signals TX within the transmit signal frequency band from the transmit signal node 52, amplify the RF transmit signals TX, and provide the amplified RF transmit signals TX to the first filtering circuitry 40A, where they are then passed from the first input/output node 38A to the common node 38C by the first filtering circuitry 40A and radiated from the antenna 50. The low noise amplifier 48 is configured to receive RF receive signals RX within the receive signal frequency band received at the antenna 50 and passed from the common node 38C to the second input/output node 38B by the second filtering circuitry 40B, amplify the RF receive signals RX, and provide the amplified RF receive signals RX to the receive signal node, where they may then be further processed by downstream circuitry.

The signal cancellation circuitry 42 receives the signals at the common node 38C including the RF transmit signals TX within the transmit signal frequency band from the power amplifier 46. As discussed above, these RF transmit signals TX have a much higher amplitude than the RF receive signals RX received at the antenna 50. It is thus very important to attenuate the RF transmit signals TX before they reach the low noise amplifier 48 in order to avoid desensitization and/or damage thereto. Accordingly, the signal cancellation circuitry 42 generates a transmit cancellation signal S_CAN based on the RF transmit signals TX within the transmit signal frequency band at the common node 38C, and provides this transmit cancellation signal S_CAN to the second input/output node 38B in order to cancel one or more components of the RF transmit signals TX in the transmit signal frequency band before they reach the low noise amplifier 48. In some embodiments, the transmit cancellation signal S_CAN is based on the particular transmit frequency of the RF transmit signals TX within the transmit signal frequency band. For example, the transmit cancellation signal S_CAN may be based on a particular resource block or resource blocks used for the RF transmit signals TX within the transmit signal frequency band.

Figure 5:
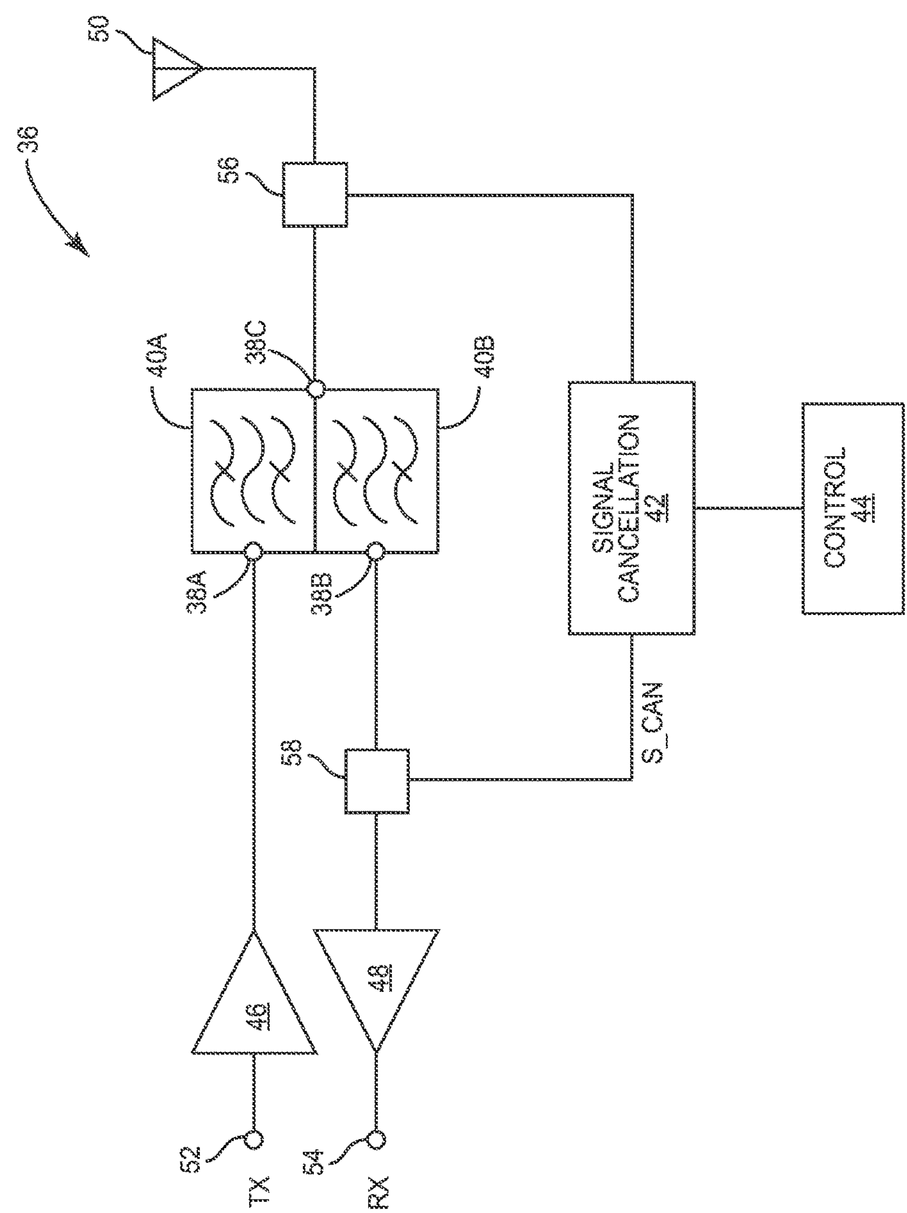

FIG. 5 shows the RF filtering circuitry 36 according to an additional embodiment of the present disclosure. The RF filtering circuitry 36 shown in FIG. 5 is substantially similar to that shown in FIG. 4, but further includes common node coupling circuitry 56 coupled between the signal cancellation circuitry 42 and the common node 38C and input/output node coupling circuitry 58 coupled between the signal cancellation circuitry 42 and the second input/output node 38B. The common node coupling circuitry 56 couples the RF transmit signals TX within the transmit signal frequency band from the common node 38C while providing minimal loading at the common node 38C and the antenna 50.

Similarly, the input/output node coupling circuitry 58 couples the transmit cancellation signal S_CAN from the signal cancellation circuitry 42 to the second input/output node 38B while providing minimal loading to the second input/output node 38B and the low noise amplifier 48. As discussed below, the common node coupling circuitry 56 and the input/output node coupling circuitry 58 may provide resistive coupling, capacitive coupling, inductive coupling, or the like, and may comprise a directional coupler and/or a transformer in various embodiments. There are many different coupling circuitries known in the art that may be used for the common node coupling circuitry 56 and the input/output node coupling circuitry 58, all of which are contemplated herein. In some embodiments, the type of coupling used for the common node coupling circuitry 56 and/or the input/output node coupling circuitry 58 may be dependent on the output impedance of the RF filtering circuitry 36. For example, if the output impedance of the RF filtering circuitry 36 is high, capacitive coupling may be used. If the output impedance of the RF filtering circuitry 36 is low, inductive coupling may be used.

Figure 6:
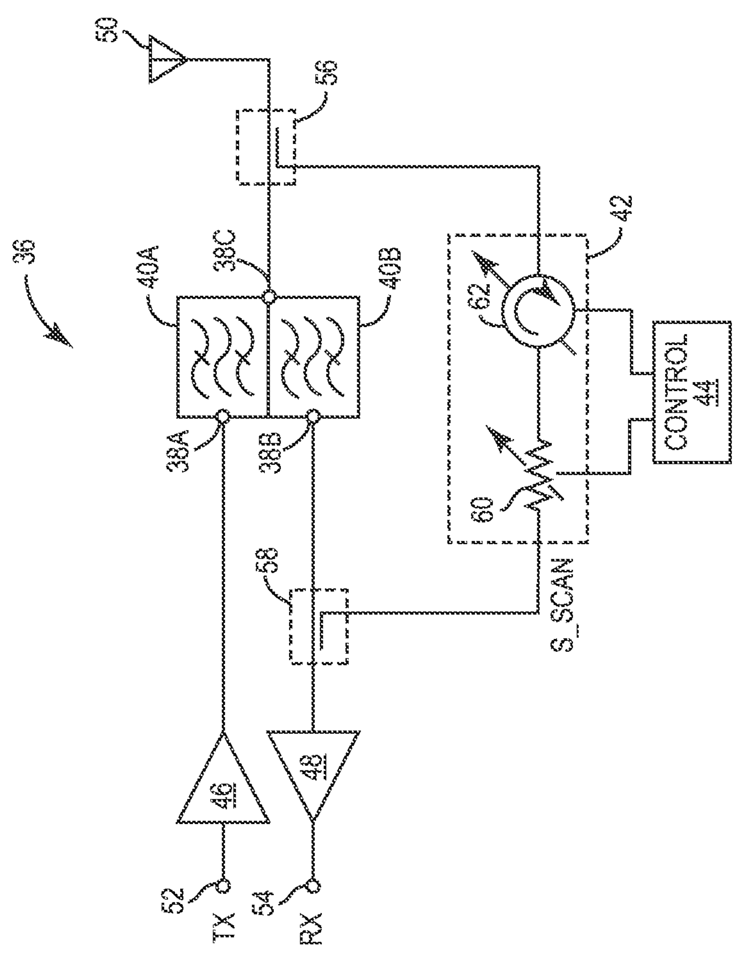

FIG. 6 shows the RF filtering circuitry 36 according to an additional embodiment of the present disclosure. The RF filtering circuitry 36 shown in FIG. 6 is substantially similar to that shown in FIG. 5, but shows further details of the signal cancellation circuitry 42, the common node coupling circuitry 56, and the input/output node coupling circuitry 58. As shown, the common node coupling circuitry 56 and the input/output node coupling circuitry 58 are directional couplers. Further, the signal cancellation circuitry 42 includes an adjustable attenuator 60 and adjustable phase shifter 62 coupled in series. The adjustable attenuator 60 is configured to adjust an amplitude of the RF transmit signals TX within the first transmit signal band at the common node 38C. The adjustable phase shifter is configured to adjust a phase of the RF transmit signals TX within the first transmit signal band at the common node 38C. Adjusting the amplitude and phase of the RF transmit signals TX within the transmit signal frequency band provides the transmit cancellation signal S_CAN. In one embodiment, the amplitude and phase of the RF transmit signals TX within the transmit signal frequency band is adjusted such that the transmit cancellation signal S_CAN provides a signal that is equal but opposite the RF transmit signals TX that are not filtered by the second filtering circuitry 40B and thus provided at the second input/output node 38B.

The control circuitry 44 may be coupled to the adjustable attenuator 60 and the adjustable phase shifter 62 to control the amount of attenuation and phase shift provided, respectively. In one embodiment, the amount of attenuation provided by the adjustable attenuator 60 and the amount of phase shift provided by the adjustable phase shifter 62 is adjusted based on the transmit frequency of the RF transmit signals TX within the transmit signal frequency band as discussed above.

While the signal cancellation circuitry 42 is shown including the adjustable attenuator 60 and the adjustable phase shifter 62 in FIG. 6, any number of different signal processing components may be provided in the signal cancellation circuitry 42 without departing from the principles of the present disclosure. Those of ordinary skill in the art will recognize that any number of different signal processing components and/or techniques may be utilized to generate the transmit cancellation signal from the RF transmit signals TX within the transmit signal frequency band, all of which are contemplated herein.

Figure 7:
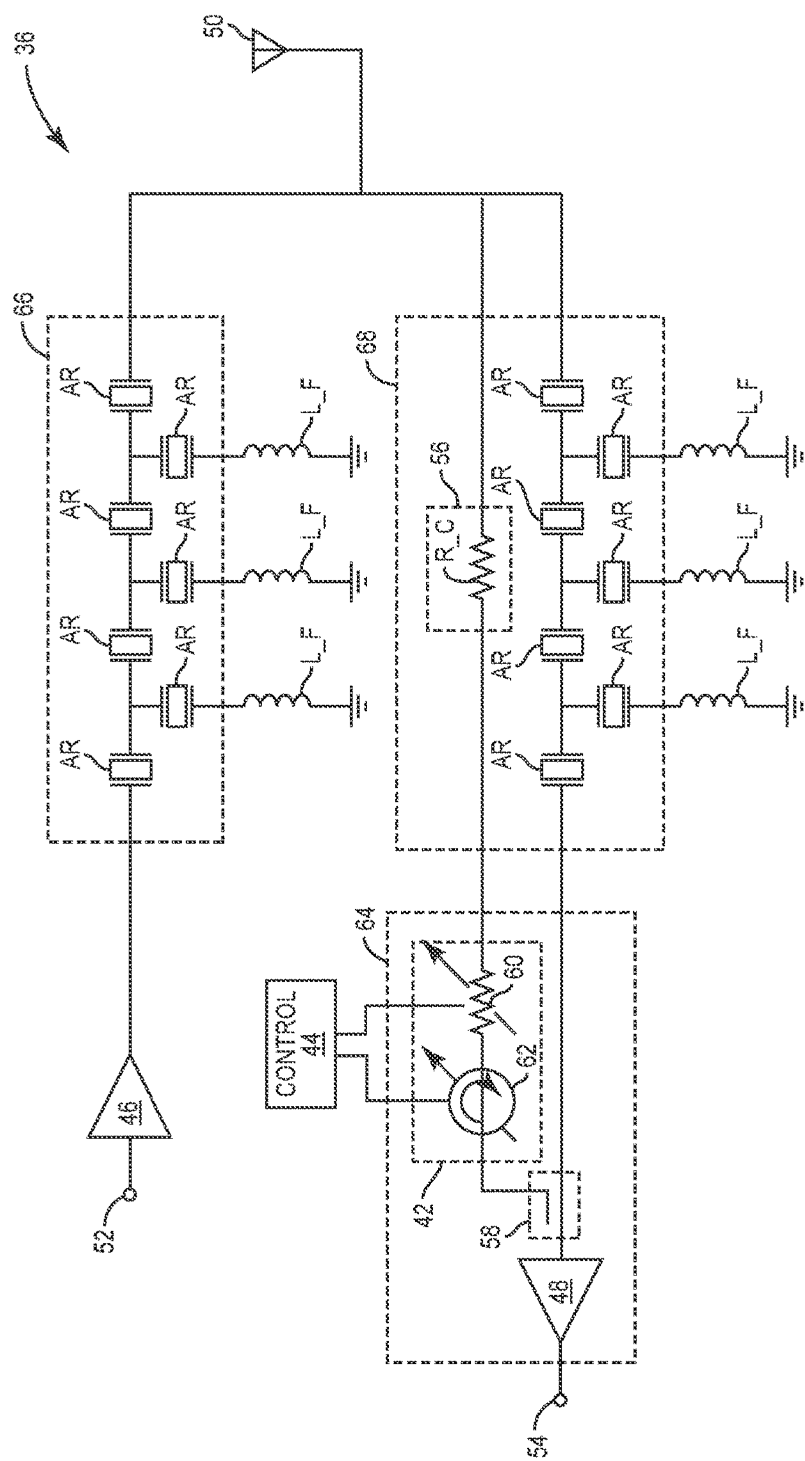

FIG. 7 shows the RF filtering circuitry 36 according to an additional embodiment of the present disclosure. The RF filtering circuitry 36 shown in FIG. 7 is substantially similar to that shown in FIG. 6, but shows further details of the first filtering circuitry 40A and the second filtering circuitry 40B. Further, the common node coupling circuitry 56 is resistive coupling circuitry including a coupling resistor R_C in place of the directional coupler shown in FIG. 6. Finally, the components of each one of the first filtering circuitry 40A, the second filtering circuitry 40B, and the low noise amplifier 48 are shown enclosed in dashed boxes representing the organization of the components into discrete semiconductor and/or acoustic die. Specifically, a first semiconductor die 64 includes the low noise amplifier 48, and may further include the signal cancellation circuitry 42 and the input/output node coupling circuitry 58. A first acoustic die 66 includes a number of acoustic resonators AR that make up the first filtering circuitry 40A. A number of filter inductors L_F are also included in the first filtering circuitry 40A, but may be located external to the first acoustic die 66. A second acoustic die 68 includes a number of acoustic resonators AR that make up the second filtering circuitry 40B. A number of filter inductors L_F are also included in the second filtering circuitry 40B, but are located external to the second acoustic die 68. Those of ordinary skill in the art will readily appreciate that the first filtering circuitry 40A and the second filtering circuitry 40B may be designed and provided in any number of different topologies using any number of different acoustic and or lumped element components, all of which are contemplated herein. The acoustic resonators AR discussed herein may be surface acoustic wave (SAW) resonators, bulk acoustic wave (BAW) resonators, or any other suitable type of resonator. The coupling resistor R_C may be provided on the second acoustic die 68 in some embodiments.

Replacing the directional coupler with the coupling resistor R_C may reduce the dependence of the RF signals coupled from the common node 38C to the signal cancellation circuitry 42 on the voltage standing wave ratio (VSWR) of the antenna 50. This may increase the consistence of RF transmit signal cancellation at the second input/output node 38B such that the cancellation is substantially independent of the VSWR of the antenna 50.

While the various parts of the RF filtering circuitry 36 are shown separated into specific semiconductor and/or acoustic die in FIG. 7, the present disclosure is not so limited. The various parts of the RF filtering circuitry 36 may be further separated into additional discrete die and/or combined onto a single die without departing from the principles of the present disclosure. Certain design constraints (e.g., the maximum bandwidth that can be accomplished via a single acoustic die) may dictate the particular separation between components in the RF filtering circuitry 36.

As discussed above, providing the signal cancellation circuitry 42 may relax certain design requirements on the first RF filtering circuitry 40A and/or the second RF filtering circuitry 40B. Generally, the largest blocker signal experienced by the second RF filtering circuitry 40B is the RF transmit signals TX within the transmit signal frequency band. Accordingly, the first filtering circuitry 40A and/or the second filtering circuitry 40B must be designed to provide a very high amount of attenuation for the RF transmit signals TX within the transmit signal frequency band in the path of the second filtering circuitry 40B. This may result in high order filters, increased complexity, real estate, and cost of the RF filtering circuitry 36. By using the signal cancellation circuitry 42 to reduce the largest blocker signal, the attenuation requirements of the first filtering circuitry 40A and the second filtering circuitry 40B for this signal may be significantly reduced, thereby allowing for the use of less complex filters, low order filters, and increased design flexibility for the filters.

Figure 8:
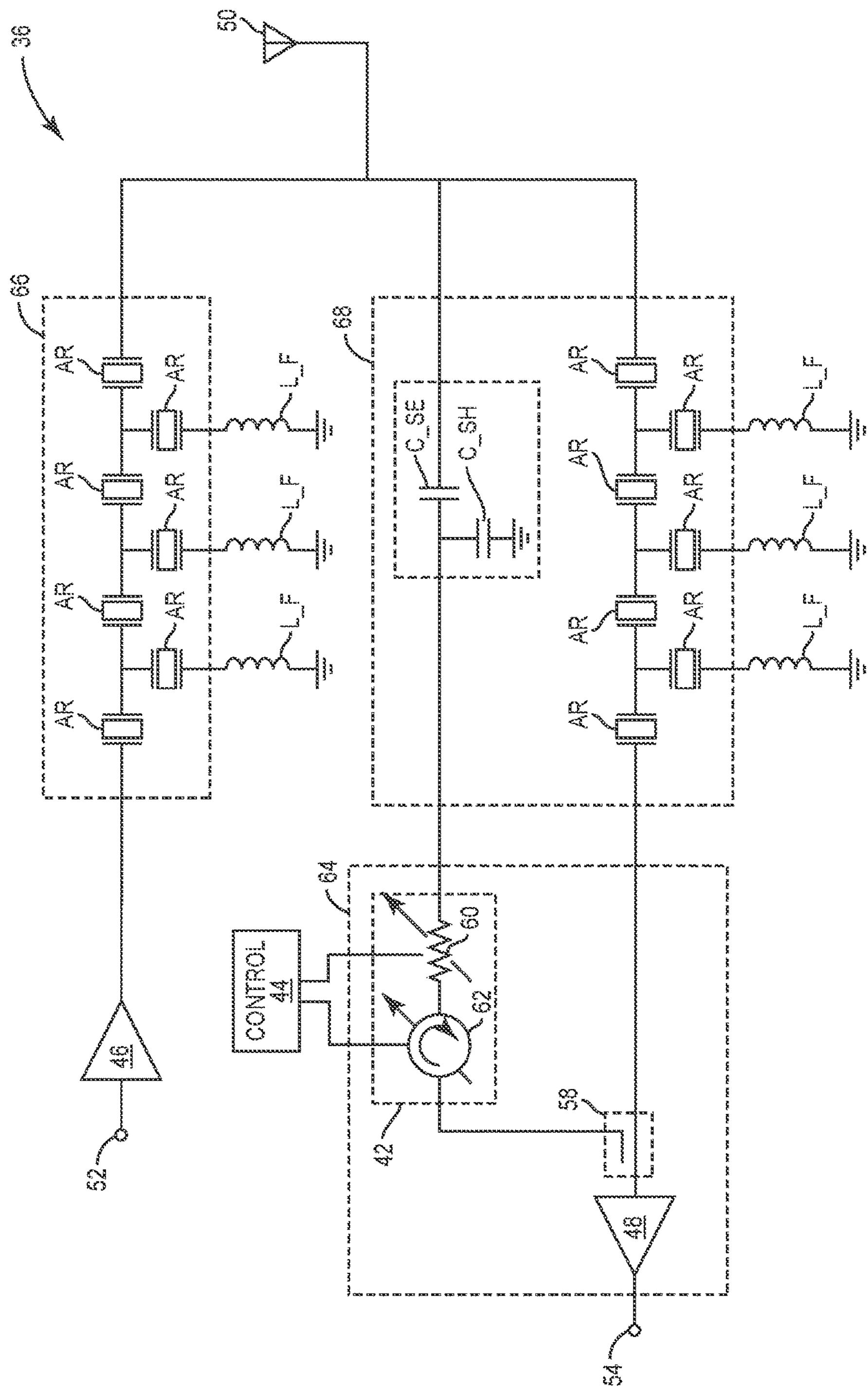

FIG. 8 shows the RF filtering circuitry 36 according to an additional embodiment of the present disclosure. The RF filtering circuitry 36 shown in FIG. 8 is substantially similar to that shown in FIG. 7, except that the common node coupling circuitry 56 is capacitive coupling circuitry including a series coupling capacitor C_SE and a shunt coupling capacitor C_SH. The series coupling capacitor C_SE and the shunt coupling capacitor C_SH may be provided on the second acoustic die 68 in some embodiments.

Similar to the resistive coupling discussed above, replacing the directional coupler with the series coupling capacitor C_CSE and the shunt coupling capacitor C_SH may reduce the dependence of the RF signals coupled from the common node 38C to the signal cancellation circuitry 42 on the voltage standing wave ratio (VSWR) of the antenna 50. This may increase the consistence of RF transmit signal cancellation at the second input/output node 38B such that the cancellation is substantially independent of the VSWR of the antenna 50.

Figure 9:
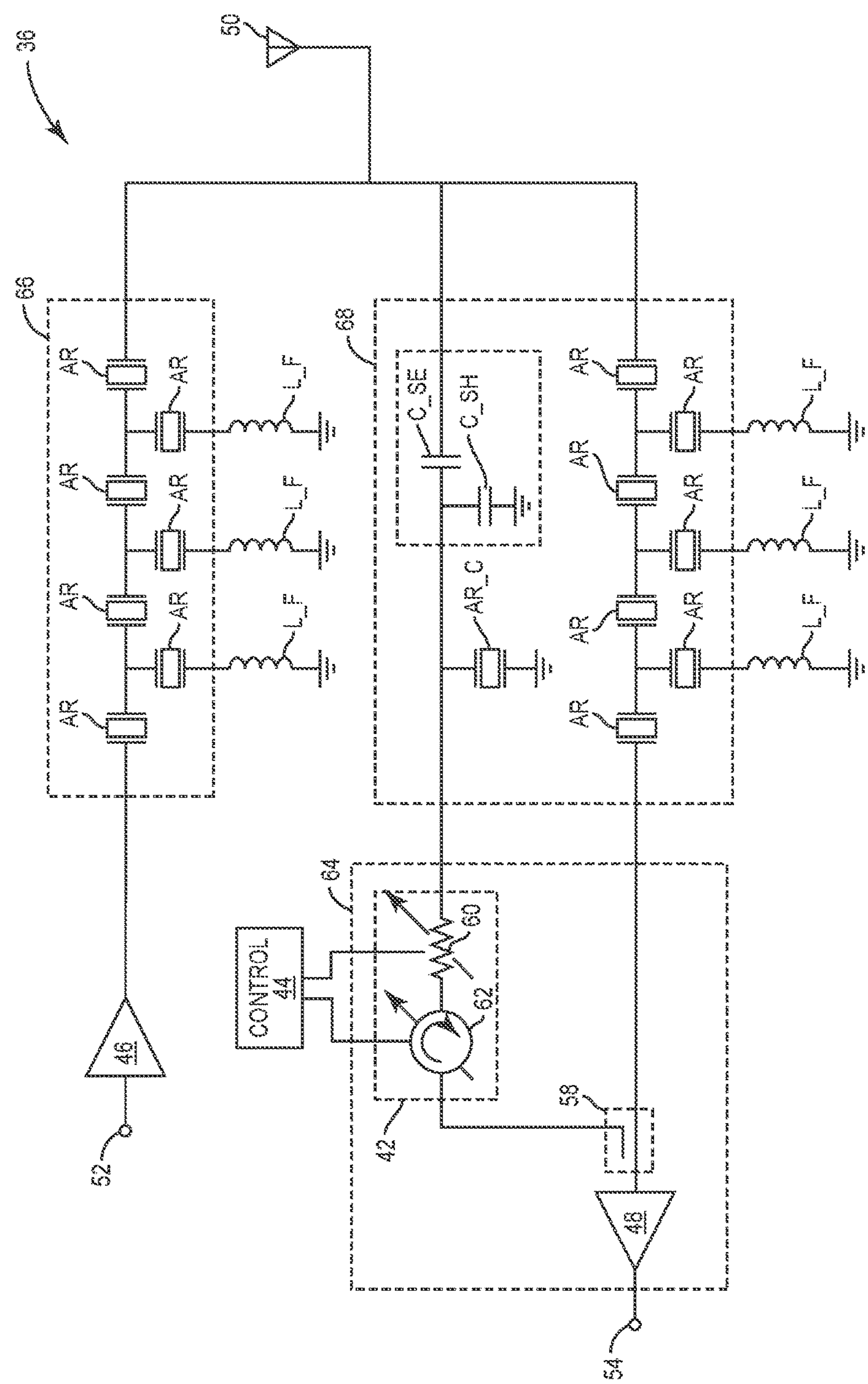

FIG. 9 shows the RF filtering circuitry 36 according to an additional embodiment of the present disclosure. The RF filtering circuitry 36 shown in FIG. 9 is substantially similar to that shown in FIG. 8, but further includes a cancellation acoustic resonator AR_C coupled in a shunt configuration between the common node coupling circuitry 56 and the signal cancellation circuitry 42. The cancellation acoustic resonator AR_C may be designed to pass the RF transmit signals TX within the transmit signal frequency band while attenuating signals outside the transmit signal frequency band. This may focus the transmit cancellation signal such that it cancels only the components of the RF transmit signals TX within the transmit signal frequency band at the second input/output node 38B, and does not degrade the RF receive signals RX within the receive signal frequency band. Alternatively, the cancellation acoustic resonator AR_C may be designed to shunt the RF receive signals RX within the receive signal frequency band to ground while passing signals outside the receive signal frequency band. Again, this may prevent the transmit cancellation signal from degrading the RF receive signals RX within the receive signal frequency band.

The cancellation acoustic resonator AR_C may be replaced by any number of different filtering components without departing from the principles of the present disclosure. For example, the cancellation acoustic resonator AR_C may be replaced by a lumped element filter such as an LC filter, an active filter, or any other filtering element known in the art without departing from the principles of the present disclosure.

Figure 10:
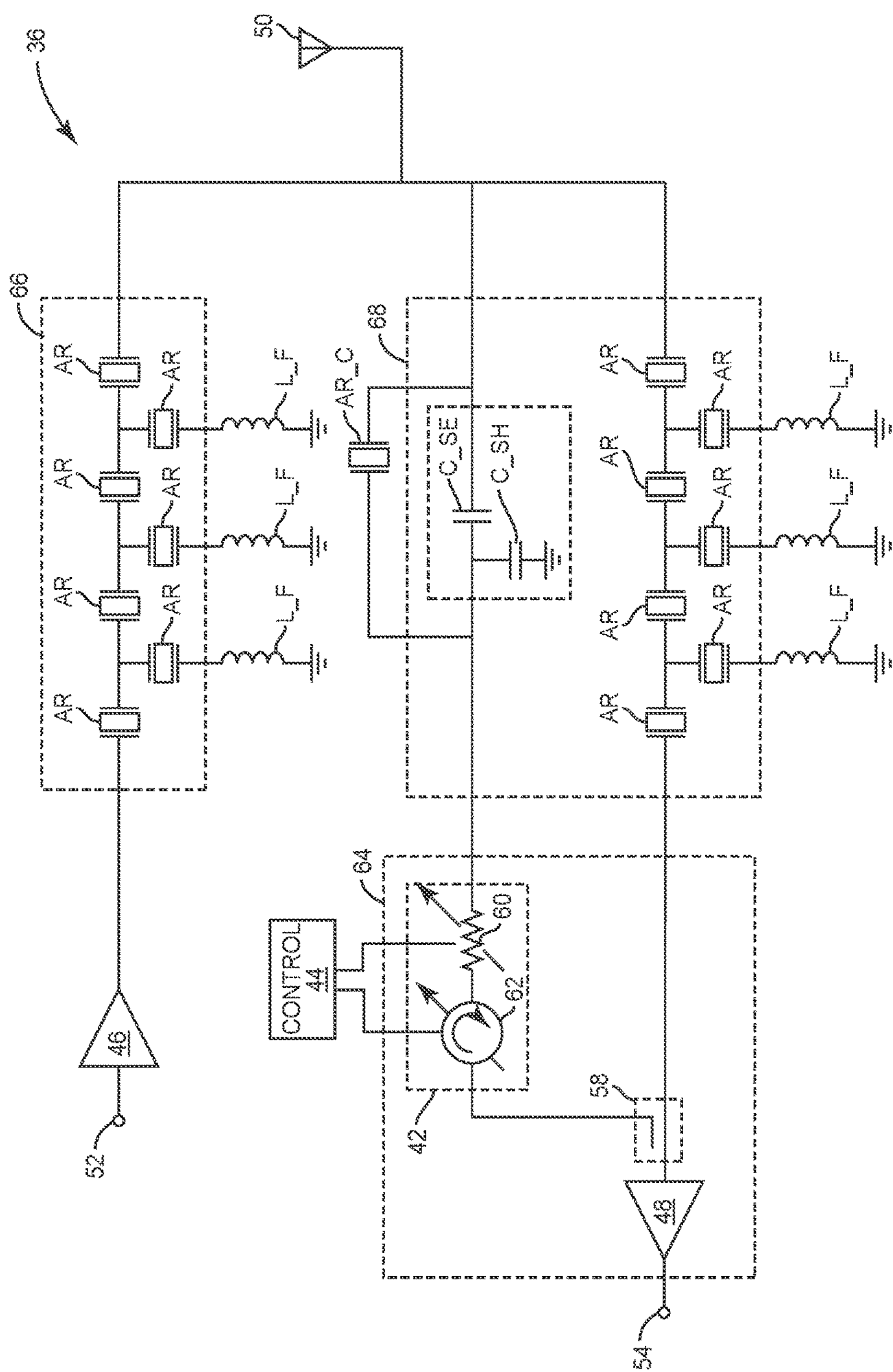
Figure 11:
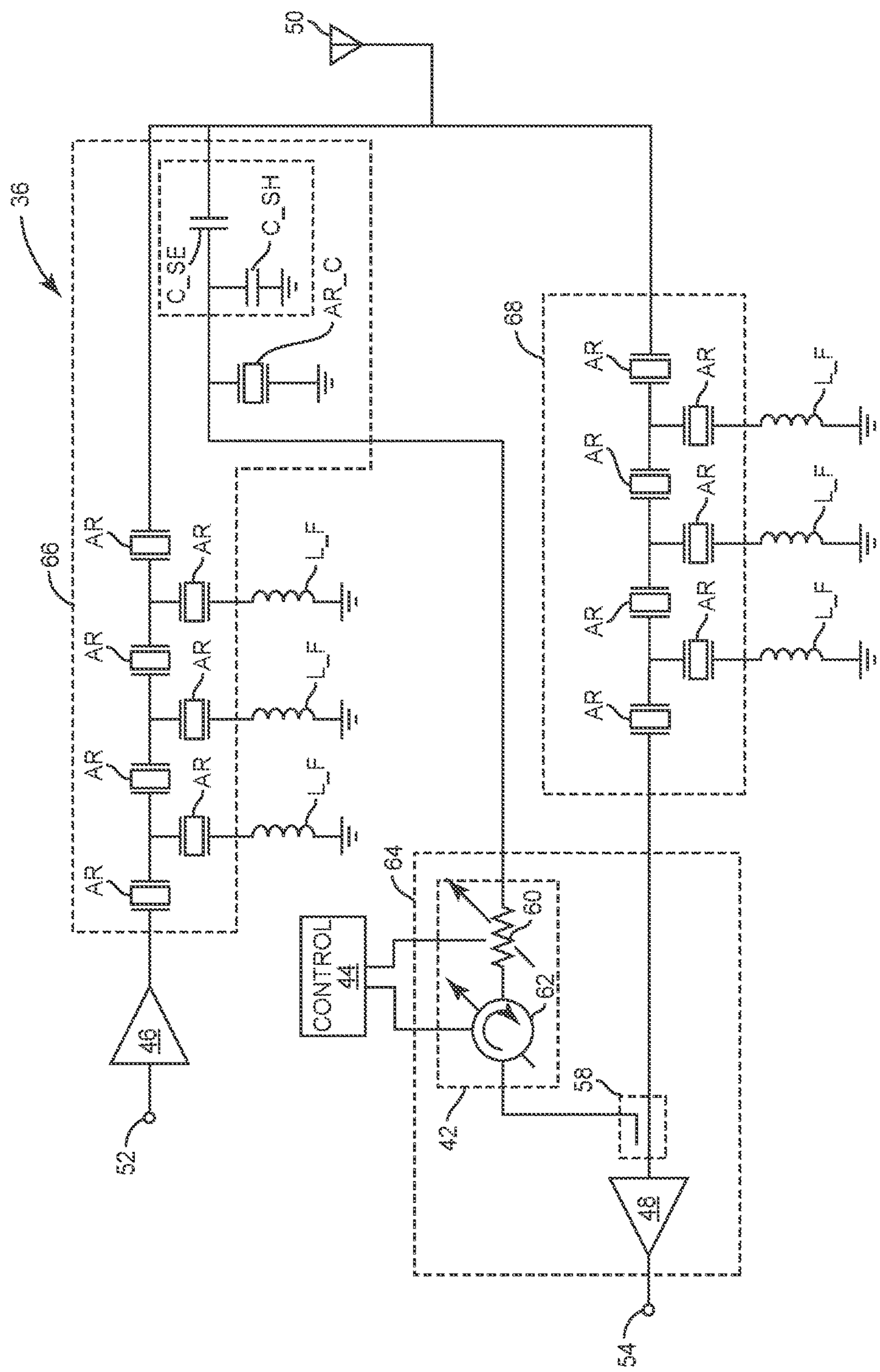

FIG. 10 shows the RF filtering circuitry 36 according to an additional embodiment of the present disclosure. The RF filtering circuitry 36 shown in FIG. 10 is substantially similar to that shown in FIG. 9, except that the cancellation acoustic resonator AR_C is coupled in parallel with the common node coupling circuitry 56. The cancellation acoustic resonator AR_C may be configured to pass the RF transmit signals TX within the transmit signal frequency band while attenuating signals outside the transmit signal frequency band. This may reduce the amount of attenuation on the RF transmit signals TX within the transmit signal frequency band that would normally be provided by the series coupling capacitor C_CSE and the shunt coupling capacitor C_CSH. The RF receive signals RX within the receive signal frequency band will be significantly attenuated by the series coupling capacitor C_CSE and the shunt coupling capacitor C_CSH, which reduces the impact of the transmit cancellation signal S_CAN on the RF receive signals RX at the second input/output node 38B.

Where the cancellation acoustic resonator AR_C is tuned at or near the transmit signal frequency band, it may make more sense to provide the cancellation acoustic resonator AR_C and the common node coupling circuitry 56 on the first acoustic die 66. Such an embodiment is shown in FIG. 11. The details of the RF filtering circuitry 36 and the operation thereof is substantially similar to that discussed above in FIG. 9. The cancellation acoustic resonator AR_C shown in the parallel configuration in FIG. 10 may similarly be provided on the first acoustic die 66.

Figure 12:
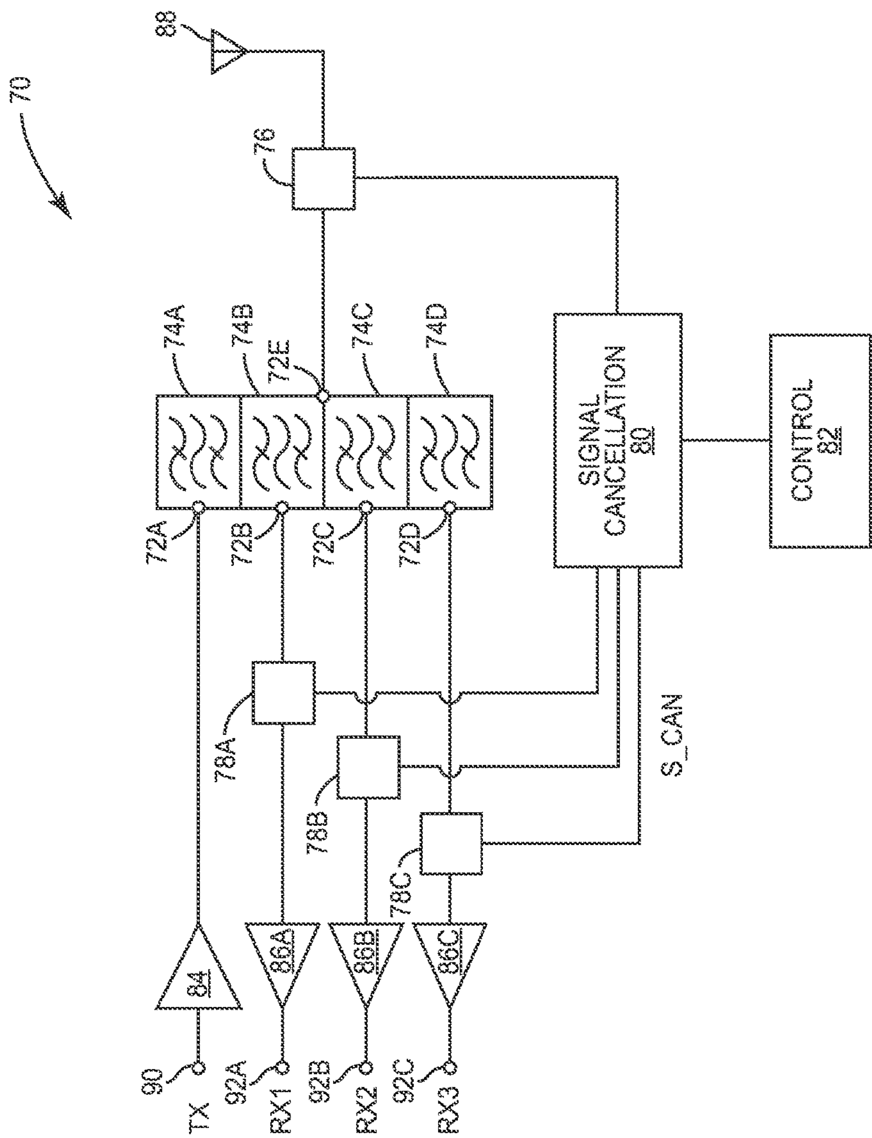

FIG. 12 shows RF filtering circuitry 70 according to an additional embodiment of the present disclosure. As discussed above, it is often the case in modern RF filtering circuitry 70 that several different transmit and/or receive frequency bands are supported. Accordingly, the RF filtering circuitry 70 shown in FIG. 12 includes a first input/output node 72A, a second input/output node 72B, a third input/output node 72C, a fourth input/output node 72D, and a common node 72E. First filtering circuitry 74A is coupled between the first input/output node 72A and the common node 72E. Second filtering circuitry 74B is coupled between the second input/output node 72B and the common node 72E. Third filtering circuitry 74C is coupled between the third input/output node 72C and the common node 72E. Fourth filtering circuitry 74D is coupled between the fourth input/output node 72D and the common node 72E. Common node coupling circuitry 76 is coupled to the common node 72E. First input/output node coupling circuitry 78A is coupled to the second input/output node 72B. Second input/output node coupling circuitry 78B is coupled to the third input/output node 72C. Third input/output node coupling circuitry 78C is coupled to the fourth input/output node 72D. Signal cancellation circuitry 80 is coupled between the common node coupling circuitry 76, the first input/output node coupling circuitry 78A, the second input/output node coupling circuitry 78B, and the third input/output node coupling circuitry 78C. Control circuitry 82 is coupled to the signal cancellation circuitry 80.

For context, a power amplifier 84, a first low noise amplifier 86A, a second low noise amplifier 86B, a third low noise amplifier 86C, and an antenna 88 are shown. The power amplifier 84 is coupled between a transmit signal node 90 and the first input/output node 72A. The first low noise amplifier 86A is coupled between a first receive signal node 92A and the second input/output node 72B. The second low noise amplifier 86B is coupled between a second receive signal node 92B and the third input/output node 72C. The third low noise amplifier 86C is coupled between a third receive signal node 92C and the fourth input/output node 72D. The antenna 88 is coupled to the common node 72E.

In operation, the first filtering circuitry 74A is configured to pass RF transmit signals TX within a transmit signal frequency band between the first input/output node 72A and the common node 72E while attenuating signals outside the transmit signal frequency band. The second filtering circuitry 74B is configured to pass RF receive signals RX within a first receive signal frequency band between the common node 72E and the second input/output node 72B while attenuating signals outside the first receive signal frequency band. The third filtering circuitry 74C is configured to pass RF receive signals within a second receive signal frequency band between the common node 72E and the third input/output node 72C while attenuating signals outside the second receive signal frequency band. The fourth filtering circuitry 74D is configured to pass RF receive signals within a third receive signal frequency band between the common node 72E and the fourth input/output node 72D while attenuating signals outside the third receive signal frequency band.

The power amplifier 84 is configured to receive RF transmit signals TX within the transmit signal frequency band, amplify the RF transmit signals TX, and provide the amplified RF transmit signals TX to the first input/output node 72A, where they are then passed by the first filtering circuitry 74A to the common node 72E. The first low noise amplifier 86A is configured to receive first RF receive signals RX1 within the first receive signal frequency band received at the antenna 88 and passed from the common node 72E to the second input/output node 72B by the second filtering circuitry 74B, amplify the first RF receive signals RX1, and pass the first amplified RF receive signals RX1 to the first receive signal node, where they may be further processed by downstream circuitry. The second low noise amplifier 86B is configured to receive second RF receive signals RX2 within the second receive signal frequency band, amplify the second RF receive signals RX2, and pass the second amplified RF receive signals RX2 to the second receive signal node, where they may be further processed by downstream circuitry. The third low noise amplifier 86C may be configured to receive third RF receive signals RX3 within the third receive signal frequency band, amplify the third RF receive signals RX3, and pass the third RF receive signals RX3 to the third receive signal node, where they may be further processed by downstream circuitry.

The signal cancellation circuitry 80 receives the signals at the common node 72E including the RF transmit signals TX within the transmit signal frequency band from the power amplifier 84. As discussed above, these RF transmit signals TX have a much higher amplitude than the RF receive signals RX received at the antenna 88. It is thus very important to attenuate the RF transmit signals TX before they reach the first low noise amplifier 86A, the second low noise amplifier 86B, and/or the third low noise amplifier 86C. Accordingly, the signal cancellation circuitry 80 generates a transmit cancellation signal S_CAN based on the RF transmit signals TX within the transmit signal frequency band at the common node 72E, and provides this transmit cancellation signal S_CAN to one or more of the second input/output node 72B, the third input/output node 72C, and the fourth input/output node 72D in order to cancel one or more components of the RF transmit signals TX in the transmit signal frequency band before they reach the respective low noise amplifiers. In some embodiments, the transmit cancellation signal S_CAN is based on the particular transmit frequency of the RF transmit signals TX within the transmit signal frequency band. For example, the transmit cancellation signal S_CAN may be based on the particular resource block or resource blocks within the transmit signal frequency band that are utilized for transmission.

Notably, the details of the common node coupling circuitry 76, the first input/output node coupling circuitry 78A, the second input/output node coupling circuitry 78B, and the third input/output node coupling circuitry 78C may be similar to that shown above. In short, the common node coupling circuitry 76, the first input/output node coupling circuitry 78A, the second input/output node coupling circuitry 78B, and the third input/output node coupling circuitry 78C may be any one of resistive coupling circuitry, capacitive coupling circuitry, inductive coupling circuitry, a directional coupler, a transformer, or the like.

Figure 13:
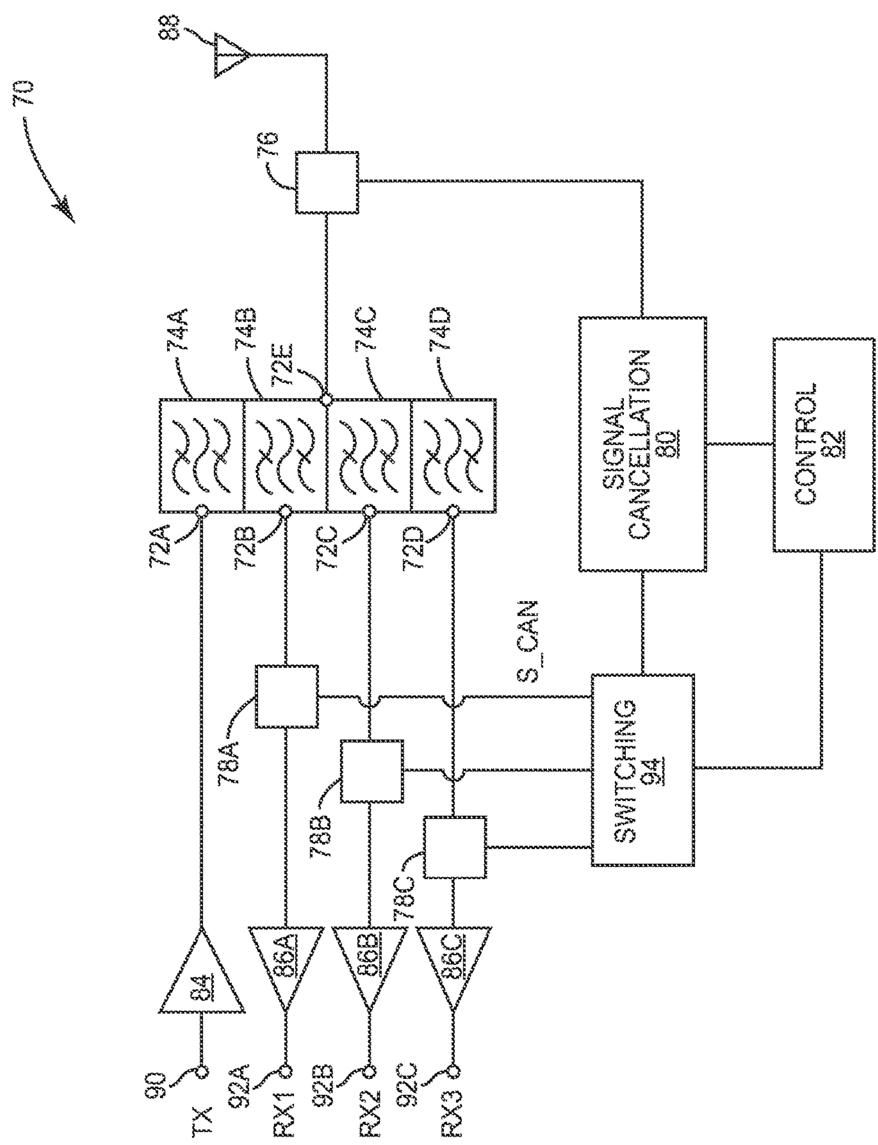

FIG. 13 shows the RF filtering circuitry 70 according to an additional embodiment of the present disclosure. The RF filtering circuitry 70 shown in FIG. 13 is substantially similar to that shown FIG. 12 but further includes switching circuitry 94 between the first input/output node coupling circuitry 78A, the second input/output node coupling circuitry 78B, the third input/output node coupling circuitry 78C, and the signal cancellation circuitry 80. The switching circuitry 94 may be coupled to the control circuitry 82 and configured to selectively provide the transmit cancellation signal S_CAN to one or more of the first input/output node coupling circuitry 78A, the second input/output node coupling circuitry 78B, and the third input/output node coupling circuitry 78C. In some cases, it may be desirable not to provide the transmit cancellation signal S_CAN to any one of the second input/output node 72B, the third input/output node 72C, and the third input/output node 72D, or to selectively provide the transmit cancellation signal S_CAN to one or more of these input/output nodes. The switching circuitry 94 may thus allow for the selective delivery of the transmit cancellation signal S_CAN.

Figure 14:
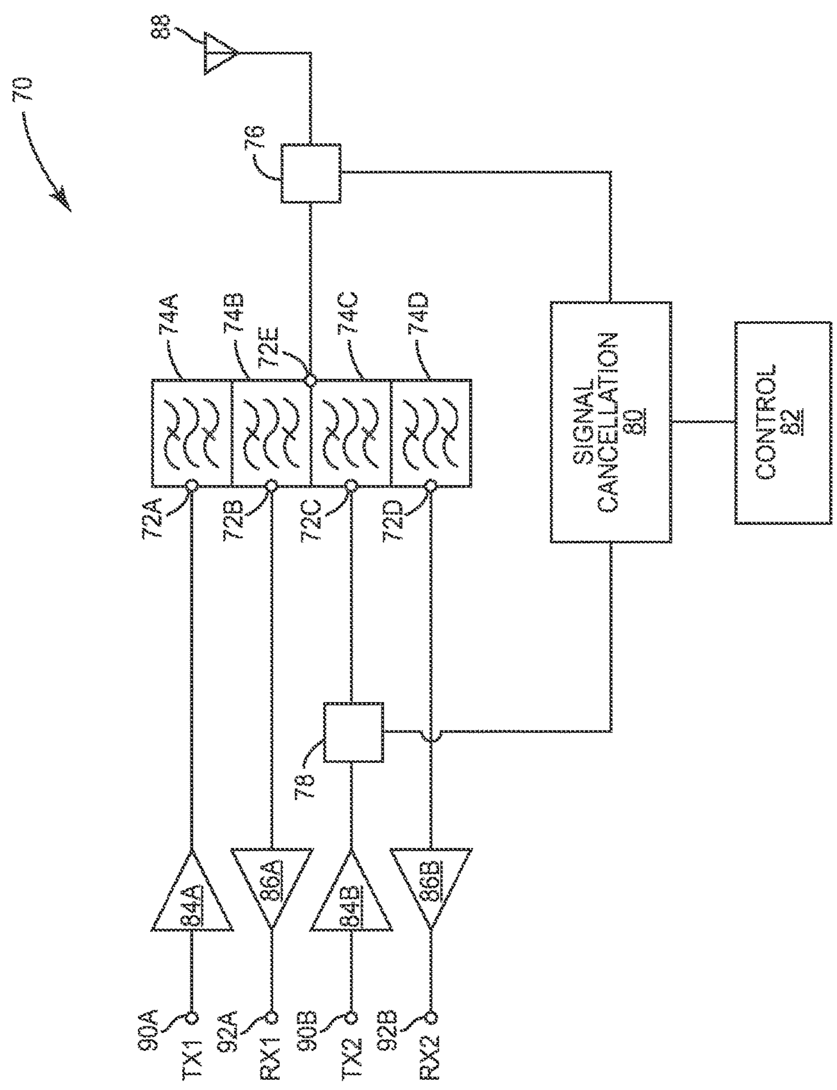

While the foregoing embodiments have focused on cancelling RF transmit signals in a receive path of RF filtering circuitry, there may be situations in which it is desirable to cancel RF transmit signals in a separate transmit path of RF filtering circuitry. This may be necessary, for example, to reduce intermodulation distortion products formed by the combination of different harmonics of separate transmit signals in the RF filtering circuitry. Accordingly, FIG. 14 shows the RF filtering circuitry 70 according to an additional embodiment of the present disclosure, wherein the RF filtering circuitry 70 is coupled to a first power amplifier 84A, a second power amplifier 84B, a first low noise amplifier 86A, and a second low noise amplifier 86B.

Specifically, the first power amplifier 84A is coupled between a first transmit signal node 90A and the first input/output node 72A, the first low noise amplifier 86A is coupled between a first receive signal node 92A and the second input/output node 72B, the second power amplifier 84B is coupled between a second transmit signal node 90B and the third input/output node 72C, and the second low noise amplifier 86B is coupled between a second receive signal node 92B and the fourth input/output node 72D. The first filtering circuitry 74A is configured to pass RF transmit signals TX within a first transmit signal frequency band between the first input/output node 72A and the common node 72E while attenuating signals outside the first transmit signal frequency band. The second filtering circuitry 74B is configured to pass RF receive signals RX within a first receive signal frequency band between the common node 72E and the second input/output node 72B while attenuating signals outside the first receive signal frequency band. The third filtering circuitry 74C is configured to pass RF transmit signals TX within a second transmit signal frequency band between the third input/output node 72C and the common node 72E while attenuating signals outside the second transmit signal frequency band. The fourth filtering circuitry 74D is configured to pass RF receive signals RX within a second receive signal frequency band between the common node 72E and the fourth input/output node 72D while attenuating signals outside the second receive signal frequency band.

The first power amplifier 84A is configured to receive first RF transmit signals TX1 within the first transmit signal frequency band from the first transmit signal node 90A, amplify the first RF transmit signals TX1, and provide the first RF transmit signals TX1 to the first input/output node 72A, where they are then passed by the first filtering circuitry 74A to the common node 72E and radiated from the antenna 88. The first low noise amplifier 86A is configured to receive first RF receive signals RX1 within the first receive signal frequency band received at the antenna 88 and passed from the common node 72E to the second input/output node 72B by the second filtering circuitry 74B, amplify the first RF receive signals RX1, and provide the amplified first RF receive signals RX1 to the first receive signal node 92A, where they may be further processed by downstream circuitry. The second power amplifier 84B is configured to receive second RF transmit signals TX2 within the second transmit signal frequency band from the second transmit signal node 90B, amplify the second RF transmit signals TX2, and provide the second RF transmit signals TX2 to the third input/output node 72C, where they are then passed by the third filtering circuitry 74C to the common node 72E and radiated from the antenna 88. The second low noise amplifier 86B is configured to receive second RF receive signals RX2 within the second receive signal frequency band received at the antenna 88 and passed from the common node 72E to the fourth input/output node 72D by the fourth filtering circuitry 74D, amplify the second RF receive signals RX2, and provide the amplified second RF receive signals RX2 to the second receive signal node 92B, where they may be further processed by downstream circuitry.

The signal cancellation circuitry 80 receives the signals at the common node 72E including the RF transmit signals within the first transmit signal frequency band from the first power amplifier 84A, and generates the transmit cancellation signal S_CAN based on these RF transmit signals. The transmit cancellation signal S_CAN is then provided to the third input/output node 72C via the input/output node coupling circuitry 78, which is coupled to the third input/output node 72C in the present embodiment. Accordingly, one or more components of the RF transmit signals TX within the first transmit signal frequency band may be cancelled from the RF transmit signals TX within the second transmit signal frequency band. Such cancellation may prevent the amplification of intermodulation distortion products that may occur due to the combination of the RF transmit signals TX within the first transmit signal frequency band and the RF transmit signals TX within the second transmit signal frequency band. As discussed above, the transmit cancellation signal S_CAN may be based on the particular frequency of the RF transmit signals TX within the first transmit signal frequency band. For example, the transmit cancellation signal S_CAN may be based on the particular resource block or resource blocks that are utilized for transmission.

Figure 15:
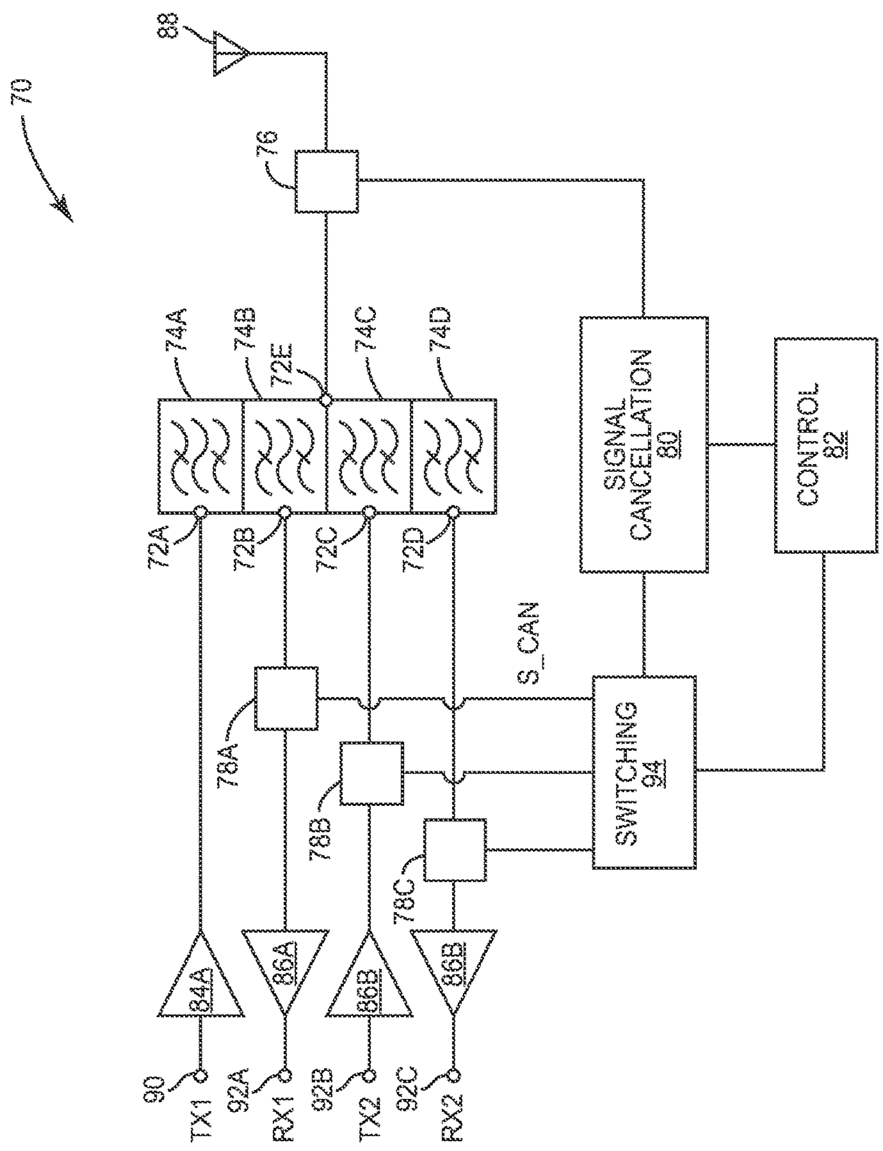

FIG. 15 shows the RF filtering circuitry 70 according to an additional embodiment in which the transmit cancellation signal S_CAN can be selectively provided to both transmit signal paths and receive signal paths. Specifically, first input/output node coupling circuitry 78A may allow the transmit cancellation signal S_CAN to be provided to the second input/output node 72B, second input/output node coupling circuitry 78B may allow the transmit cancellation signal S_CAN to be provided to the third input/output node 72C, and third input/output node coupling circuitry 78C may allow the transmit cancellation signal S_CAN to be provided to the fourth input/output node 72D. The switching circuitry 94 may allow the transmit cancellation signal S_CAN to be provide to each one of the first input/output node coupling circuitry 78A, the second input/output node coupling circuitry 78B, and the third input/output node coupling circuitry 78C or any subset thereof.

Those skilled in the art will recognize improvements and modifications to the embodiments of the present disclosure. All such improvements and modifications are considered within the scope of the concepts disclosed herein and the claims that follow.

What is claimed is:

1. Radio frequency (RF) filtering circuitry comprising:

a first transmit signal node;

a second transmit signal node;

a common node;

first transmit signal filtering circuitry coupled between the first transmit signal node and the common node and configured to pass RF transmit signals within a first transmit signal frequency band between the first transmit signal node and the common node while attenuating signals outside the first transmit signal frequency band;

second transmit signal filtering circuitry coupled between the second transmit signal node and the common node and configured to pass RF transmit signals within a second transmit signal frequency band between the second transmit signal node and the common node while attenuating signals outside the second transmit signal frequency band; and transmit signal cancellation circuitry coupled between the common node and the second transmit signal node and configured to generate a transmit cancellation signal from the RF transmit signals within the first transmit signal frequency band and provide the transmit cancellation signal to the second transmit signal node in order to cancel one or more components of the RF transmit signals within the first transmit signal frequency band at the second transmit signal node.

2. The RF filtering circuitry of claim 1 wherein the transmit cancellation signal is based on a transmit frequency of the RF transmit signals within the first transmit signal frequency band.

3. The RF filtering circuitry of claim 1:

wherein the transmit signal cancellation circuitry comprises an adjustable attenuator configured to adjust an amplitude of the RF transmit signals within the first transmit signal frequency band and an adjustable phase shifter coupled in series with the adjustable attenuator and configured to adjust a phase of the RF transmit signals within the first transmit signal frequency band; and the RF filtering circuitry further comprises:

common node coupling circuitry coupled between the transmit signal cancellation circuitry and the common node; and transmit node coupling circuitry coupled between the transmit signal cancellation circuitry and the second transmit signal node.

4. The RF filtering circuitry of claim 3 wherein the adjustable attenuator and the adjustable phase shifter are adjusted based on a transmit frequency of the RF transmit signals within the first transmit signal frequency band.

5. The RF filtering circuitry of claim 3 wherein the common node coupling circuitry provides capacitive coupling between the common node and the transmit signal cancellation circuitry.

6. The RF filtering circuitry of claim 5 wherein the transmit node coupling circuitry provides capacitive coupling between the second transmit signal node and the transmit signal cancellation circuitry.

7. The RF filtering circuitry of claim 5 wherein the transmit node coupling circuitry provides resistive coupling between the second transmit signal node and the transmit signal cancellation circuitry.

8. The RF filtering circuitry of claim 5 wherein the transmit node coupling circuitry is a directional coupler configured to couple the transmit cancellation signal from the transmit signal cancellation circuitry to the second transmit signal node.

9. The RF filtering circuitry of claim 3 wherein the common node coupling circuitry provides resistive coupling between the common node and the transmit signal cancellation circuitry.

10. The RF filtering circuitry of claim 9 wherein the transmit node coupling circuitry provides capacitive coupling between the second transmit signal node and the transmit signal cancellation circuitry.

11. The RF filtering circuitry of claim 9 wherein the transmit node coupling circuitry provides resistive coupling between the second transmit signal node and the transmit signal cancellation circuitry.

12. The RF filtering circuitry of claim 9 wherein the transmit node coupling circuitry is a directional coupler configured to couple the transmit cancellation signal from the transmit signal cancellation circuitry to the second transmit signal node.

13. The RF filtering circuitry of claim 3 wherein the common node coupling circuitry is a directional coupler configured to couple signals at the common node to the transmit signal cancellation circuitry.

14. The RF filtering circuitry of claim 13 wherein the transmit node coupling circuitry provides capacitive coupling between the second transmit signal node and the transmit signal cancellation circuitry.

15. The RF filtering circuitry of claim 13 wherein the transmit node coupling circuitry provides resistive coupling between the second transmit signal node and the transmit signal cancellation circuitry.

16. The RF filtering circuitry of claim 13 wherein the transmit node coupling circuitry is a directional coupler configured to couple the transmit cancellation signal from the transmit signal cancellation circuitry to the second transmit signal node.

17. The RF filtering circuitry of claim 3 further comprising cancellation filtering circuitry coupled between the transmit signal cancellation circuitry and the common node coupling circuitry and configured to pass RF transmit signals within the first transmit signal frequency band while attenuating signals outside the first transmit signal frequency band.

18. The RF filtering circuitry of claim 3 further comprising cancellation filtering circuitry coupled between the transmit signal cancellation circuitry and the common node coupling circuitry and configured to attenuate RF transmit signals within the second transmit signal frequency band while passing signals outside the second transmit signal frequency band.

19. The RF filtering circuitry of claim 1 wherein the transmit signal cancellation circuitry comprises:

a capacitive divider attenuator comprising a series capacitor coupled between the common node and the second input/output node and a shunt capacitor coupled between the second input/output node and ground; and an acoustic resonator coupled between the second input/output node and ground and configured to pass the RF transmit signals within the first transmit signal frequency band from the common node to the second input/output node while attenuating signals outside the first transmit signal frequency band.

20. The RF filtering circuitry of claim 19 wherein:

the first transmit signal filtering circuitry is located on a first acoustic die;

the second transmit signal filtering circuitry is located on a second acoustic die that is separate from the first acoustic die; and the transmit signal cancellation circuitry is located on the first acoustic die.

21. The RF filtering circuitry of claim 1 wherein the transmit signal cancellation circuitry comprises:

a capacitive divider attenuator comprising a series capacitor coupled between the common node and the second input/output node and a shunt capacitor coupled between the second input/output node and ground; and an acoustic resonator coupled in series with the series capacitor such that the acoustic resonator is coupled between the second input/output node and the series capacitor, the acoustic resonator configured to pass the RF transmit signals within the first transmit signal frequency band from the common node to the second input/output node while attenuating signals outside the first transmit signal frequency band.

22. Radio frequency (RF) filtering circuitry comprising:

a first transmit signal node;

a second transmit signal node;

a third transmit signal node;

a common node;

first transmit signal filtering circuitry coupled between the first transmit signal node and the common node and configured to pass RF transmit signals within a first RF transmit signal frequency band between the first transmit signal node and the common node while attenuating signals outside the first transmit signal frequency band;

second transmit signal filtering circuitry coupled between the second transmit signal node and the common node and configured to pass RF transmit signals within a second transmit signal frequency band between the second transmit signal node and the common node while attenuating signals outside the second transmit signal frequency band;

third transmit signal filtering circuitry coupled between the third transmit signal node and the common node and configured to pass RF transmit signals within a third transmit signal frequency band between the third transmit signal node and the common node while attenuating signals outside the third transmit signal frequency band; and transmit signal cancellation circuitry coupled between the common node, the second transmit signal node, and the third transmit signal node and configured to generate a transmit cancellation signal from the RF transmit signals within the first transmit signal frequency band and selectively provide the transmit cancellation signal to one or more of the second transmit signal node and the third transmit signal node in order to cancel one or more components of the RF transmit signals within the first transmit signal frequency band at the second transmit signal node and the third transmit signal node, respectively.

23. Radio frequency (RF) filtering circuitry comprising:

a first transmit signal node;

a second transmit signal node;

a receive signal node;

a common node;

first transmit signal filtering circuitry coupled between the first transmit signal node and the common node and configured to pass RF transmit signals within a first RF transmit signal frequency band between the first transmit signal node and the common node while attenuating signals outside the first transmit signal frequency band;

second transmit signal filtering circuitry coupled between the second transmit signal node and the common node and configured to pass RF transmit signals within a second RF transmit signal frequency band between the second transmit signal node and the common node while attenuating signals outside the second transmit signal frequency band;

receive signal filtering circuitry coupled between the third transmit signal node and the common node and configured to pass RF receive signals within a receive signal frequency band between the receive signal node and the common node while attenuating signals outside the receive signal frequency band; and transmit signal cancellation circuitry coupled between the common node, the second transmit signal node, and the receive signal node and configured to generate a transmit cancellation signal from the RF transmit signals within the first transmit signal frequency band and selectively provide the transmit cancellation signal to one or more of the second transmit signal node and the receive signal node in order to cancel one or more components of the RF transmit signals within the first transmit signal frequency band at the second transmit signal node and the receive signal node, respectively.

* * * * *

UNITED STATES PATENT AND TRADEMARK OFFICE

CERTIFICATE OF CORRECTION

PATENT NO. : 10,009,052 B2
APPLICATION NO. : 15/420369
DATED : June 26, 2018
INVENTOR(S) : Nadim Khlat et al.

It is certified that error appears in the above-identified patent and that said Letters Patent is hereby corrected as shown below:

In the Specification

In Column 2, Line 5, replace “first input/output node 34A” with --first first input/output node 34A--.

In Column 2, Lines 11 and 12, replace “second input/output node 36B” with --second second input/output node 36B--.

Signed and Sealed this
Twenty-first Day of August, 2018

Andrei Iancu
*Director of the United States Patent and Trademark Office*